United States Patent
Jurczyk

(10) Patent No.: US 10,072,766 B2
(45) Date of Patent: Sep. 11, 2018

(54) VALVE

(71) Applicant: LB Bentley Limited, Stroud, Gloucestershire (GB)

(72) Inventor: Krzysztof Jurczyk, Stroud (GB)

(73) Assignee: LB Bentley Limited, Stroud, Gloucestershi (GB)

( * ) Notice: Subject to any disclaimer, the term of this patent is extended or adjusted under 35 U.S.C. 154(b) by 39 days.

(21) Appl. No.: 15/311,010

(22) PCT Filed: May 15, 2015

(86) PCT No.: PCT/GB2015/051447
§ 371 (c)(1),
(2) Date: Nov. 14, 2016

(87) PCT Pub. No.: WO2015/173591
PCT Pub. Date: Nov. 19, 2015

(65) Prior Publication Data
US 2017/0108132 A1    Apr. 20, 2017

(30) Foreign Application Priority Data

May 15, 2014    (GB) .................................. 1408630.0

(51) Int. Cl.
*F16K 15/02*    (2006.01)
*F16K 15/06*    (2006.01)

(52) U.S. Cl.
CPC .......... *F16K 15/026* (2013.01); *F16K 15/063* (2013.01)

(58) Field of Classification Search
CPC .... F16K 15/026; F16K 15/145; F16K 15/148; F16K 15/021; F16K 15/14; F16K 15/16; F16K 1/465; Y10T 137/7868

(Continued)

(56) References Cited

U.S. PATENT DOCUMENTS 2,131,928 A * 10/1938 Abegg .................. F04B 53/102
                                                     137/516.29
2,214,799 A *  9/1940 Sharp .................. F04B 53/1025
                                                     137/533.23

(Continued)

FOREIGN PATENT DOCUMENTS

FR          2580773           10/1986

OTHER PUBLICATIONS

Search Report for Great Britain Patent Application No. GB1408630.0 dated Jun. 2, 2014.

(Continued)

*Primary Examiner* — Mary McManmon
*Assistant Examiner* — Nicole Gardner
(74) *Attorney, Agent, or Firm* — Andrus Intellectual Property Law, LLP

(57) ABSTRACT

A check valve including a valve member movable with a passage in a housing is disclosed. A biasing means applies a biasing load to the valve member to urge the valve member into engagement with a seating surface within the passage to control fluid flow. An environmental seal member is secured to the valve member by a retainer member. The retainer member includes a lip elastically deflectable by the environmental seal member upon compression and/or deflection of the environmental seal member. When the valve member engages the seating surface, the environmental seal member engages the seating surface to compress and/or deflect the environmental seal member, deflects the lip of the retainer member into engagement with the seating surface. Extrusion of the environmental seal member between the retainer member and the seating surface can be reduced and the engagement between the lip and the seating surface may be a sealing engagement.

11 Claims, 1 Drawing Sheet

(58) Field of Classification Search
USPC .................................................. 251/332, 334
See application file for complete search history.

(56) References Cited

U.S. PATENT DOCUMENTS

| | | | | |
|---|---|---|---|---|
| 2,329,576 A | * | 9/1943 | Anderson | F04B 53/1027 137/516.29 |
| 2,417,494 A | * | 3/1947 | Hoof | F16K 1/34 251/332 |
| 2,495,880 A | * | 1/1950 | Volpin | F04B 53/1027 137/516.29 |
| 2,613,054 A | * | 10/1952 | Maier | F04B 53/1027 251/332 |
| 2,675,021 A | | 4/1954 | Frederick | |
| 2,845,945 A | * | 8/1958 | Mancusi, Jr. | F16K 1/46 137/469 |
| 3,057,372 A | * | 10/1962 | Sutton | F04B 53/1027 137/516.29 |
| 3,070,120 A | * | 12/1962 | Wendt | F16K 1/46 137/516.29 |
| 3,548,868 A | * | 12/1970 | Mullaney | F16K 15/026 137/243 |
| 3,605,802 A | * | 9/1971 | Hertell | F16K 15/063 137/514.3 |
| 4,132,246 A | | 1/1979 | Frisen | |
| 4,518,329 A | | 5/1985 | Weaver | |
| 4,860,995 A | * | 8/1989 | Rogers | F04B 53/1027 137/516.29 |
| 5,193,577 A | * | 3/1993 | de Koning | F04B 53/102 137/516.29 |
| 5,249,600 A | * | 10/1993 | Blume | F04B 53/1087 137/516.29 |
| 2010/0006159 A1 | | 1/2010 | Lin et al. | |
| 2012/0285551 A1 | | 11/2012 | Lewandowski et al. | |

OTHER PUBLICATIONS

International Search Report and Written Opinion for International Application No. PCT/GB2015/051447 dated Aug. 6, 2015.

* cited by examiner

VALVE

CROSS-REFERENCE TO RELATED APPLICATIONS

This application is the U.S. national stage application of International Application PCT/GB2015/051447, filed May 15, 2015, which international application was published on Nov. 19, 2015, as International Publication WO 2015/173591 A1 in the English language. The International Application claims priority of Great Britain Patent Application 1408630.0, filed May 15, 2014.

FIELD

This invention relates to a valve, and in particular to a check valve with improved leakage resistance.

BACKGROUND

Check valves are in widespread use, serving to prevent flow in a reverse direction along a passage. A typical check valve comprises a valve member which is urged against an associated seat by a spring or other resilient biasing load, the valve member being able to be lifted from the seat against the action of the biasing load by the fluid pressure upstream of the check valve when that pressure exceeds that downstream of the check valve by a predetermined level. If the pressure difference is lower than the aforementioned predetermined level, or indeed if the pressure downstream of the valve is greater than that upstream of the valve as would be the case if fluid were flowing in the reverse direction, the biasing load serves to firmly seat the valve member against the seat, preventing fluid flow through the valve.

There is the risk that, for example, damage to the valve member or damage to the seat may result in the valve being incapable of fully sealing even when the valve member is engaged against the seat. Accordingly, fluid may be able to leak past the valve even when the valve is closed. This is undesirable.

Likewise, where the valve member has a conical shaped sealing surface, and valve seat takes a corresponding conical form, there is a risk that slight tilting or misalignment of the valve member with the seat can result in ineffective sealing thereof, and so can result in leakage.

It is known to provide such a valve with an environmental seal to improve leakage resistance. By way of example, a flexible seal member may be attached to the valve member and engageable with the seat. However, there is a tendency, over time, for the flexible seal member to deform or extrude, resulting in 'tails' of the flexible seal member material forming which may become trapped between the valve member and the seat, causing or increasing leakage through the valve.

SUMMARY

It is an object of the invention to provide a check valve in which at least some of the disadvantages with existing designs of check valve are overcome or are of reduced effect.

According to the present invention there is provided a check valve comprising a valve member movable with a passage provided in a housing, the passage defining a seating surface with which the valve member is engageable to control fluid flow along the passage, biasing means applying a biasing load to the valve member urging the valve member into engagement with the seating surface, and an environmental seal member secured to the valve member by a retainer member, the environmental seal member being engageable with the seating surface, wherein the retainer member includes a lip elastically deflectable by the environmental seal member upon compression of the environmental seal member such that when the valve member engages the seating surface, engagement of the environmental seal member with the seating surface results in compression and/or deflection of the environmental seal member, in turn causing deflection of the lip of the retainer member into engagement with the seating surface.

In prior arrangements, a void is typically present between the retainer member and the seating surface, and the environmental seal member may deform or extrude into the void. Such deformation or extrusion may be permanent, leading to the aforementioned 'tails'. In accordance with the invention, the deflection of the lip into engagement with the seating surface preferably serves to prevent the formation of such a void into which the environmental seal member can deform or extrude, upon closure of the valve, thereby reducing the formation of such 'tails'.

The lip preferably deflects into sealing engagement with the seating, preferably forming a metal-to-metal seal therewith and so further enhancing the sealing of the valve.

The valve member is conveniently guided for sliding movement within the passage. As a result, the risk of misalignment between the valve member and the seating surface is reduced. The part of the valve member engageable with the seating surface is preferably of part spherical form. As a result, sealing is enhanced even if slight misalignments occur.

The environmental seal member is conveniently of a PTFE material.

The retainer member is preferably of metallic form such that the seal formed between the lip and the seating surface is a metal-to-metal seal.

The retainer member is conveniently shaped to include an annular recess adjacent its periphery, whereby the lip is defined.

The retainer member is conveniently secured to the valve member by being in screw threaded engagement therewith. It will be appreciated, however, that other fixing techniques could be used.

The environmental seal member preferably includes a sealing surface of substantially conical form, having a different cone angle to the seating surface such that engagement of the environmental seal member with the seating surface causes compression or deflection of at least part thereof, applying a load to the retainer member causing the aforementioned deflection of the lip.

BRIEF DESCRIPTION OF THE DRAWINGS

The invention will further be described, by way of example, with reference to the accompanying drawings, in which.

DETAILED DESCRIPTION OF THE DRAWINGS

Figure 1:
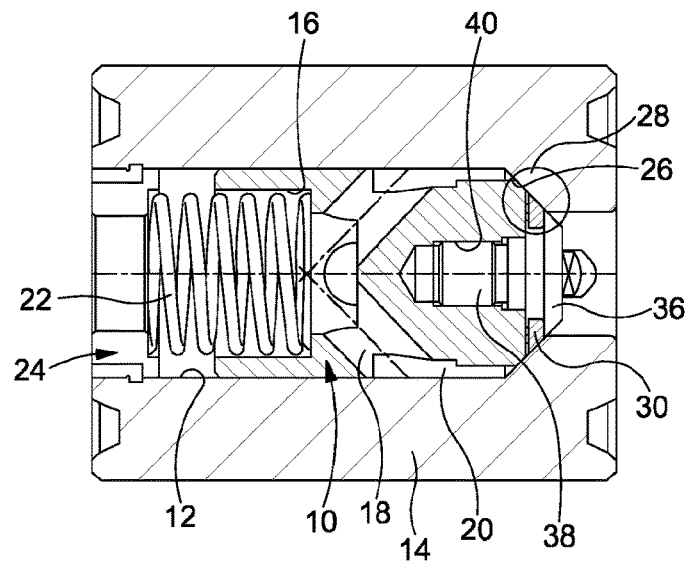
FIG. 1 is a sectional view illustrating a check valve in accordance with an embodiment of the invention.
Figure 3:
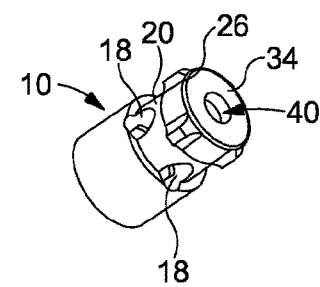
FIG. 3 is a perspective view of a valve member of the embodiment of FIG. 1.

Referring to the accompanying drawings, a check valve is illustrated, the check valve comprising a valve member 10 slidable within a passage 12 formed in a valve housing 14. As best shown in FIGS. 1 and 3, the valve member 10 includes a blind bore 16 at one end thereof which communicates via angled passages 18 with an annular chamber 20 defined between the valve member 10 and the wall of the passage 12. The blind bore 16 accommodates an end part of a spring 22, the other end of which engages a spring abutment assembly 24 located within the passage 12. The spring 22 applies a biasing load to the valve member 10 urging the valve member 10 towards an axial position in which a sealing surface 26 thereof engages with a seating surface 28 defined by a part of the passage 12. Between the sealing surface 26 and the annular chamber 20, the outer surface of the valve member 10 is of fluted form.

In use, the valve member 10 is urged by the spring 22 towards a position in which the sealing surface 26 thereof engages with the seating surface 28, forming a seal therewith and preventing fluid flow along the passage 12. If the fluid pressure upstream of the valve (ie to the right of the valve in the orientation shown in FIG. 1) exceeds the fluid pressure downstream thereof (ie to the left of the valve as shown in FIG. 1) by an amount sufficient that a load is applied to the valve member 10 arising from the action of the different fluid pressures on parts of the valve member 10 is able to overcome the load applied by the spring, then the valve member 10 will lift from the seating surface 28 allowing fluid to flow from the upstream side, past the sealing surface 26, through the fluted region to the chamber 20, and from the chamber 20 through the passages 18 and blind bore 16, to continue flowing along the passage 12.

Upon a reduction in the pressure difference, or if the downstream pressure exceeds the upstream pressure, the valve member 10 may be able to return into engagement with the seating surface 28, thereby ceasing fluid flow along the passage 12. It will be appreciated, therefore, that the check valve serves to permit fluid to flow only one direction through the valve.

The fit of the valve member 10 within the passage 12 is such that the valve member 10 is accurately guided for movement, thus the risk of the valve member 10 being misaligned with the seating surface 28 is low. Furthermore, the sealing surface 26 is of part spherical form so that, even if the valve member 10 is tilted slightly relative to the axis of the seating surface 28, good sealing of the valve will still occur.

Figure 2:
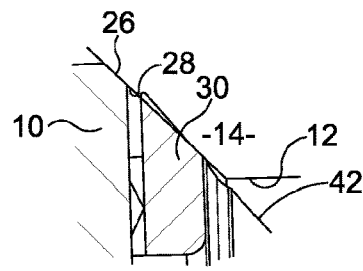
FIG. 2 is an enlargement of part of the embodiment of FIG. 1.
Figure 4:
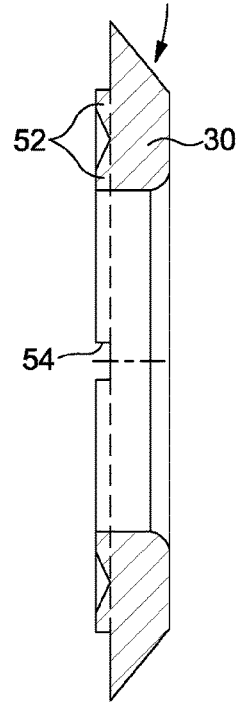
FIG. 4 is a sectional view of an environmental seal member of the embodiment of FIG. 1.
Figure 5:
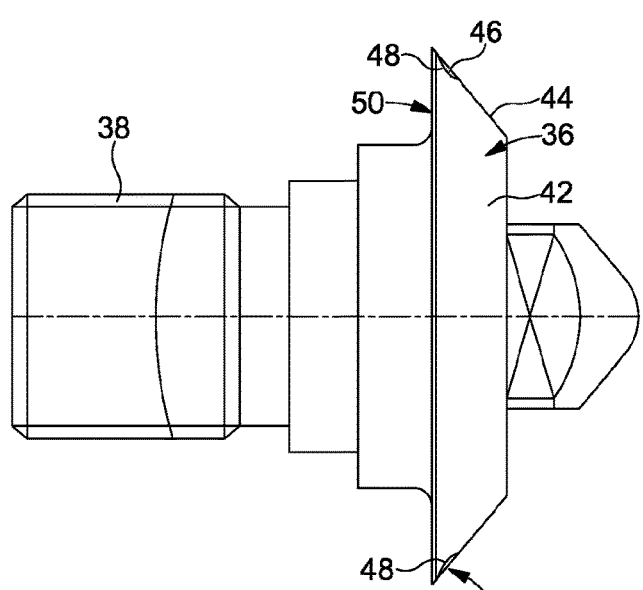
FIG. 5 is a view illustrating a retainer member of the embodiment of FIG. 1.

In accordance with the invention, the valve member 10 carries an environmental seal member 30, as best shown in FIGS. 2 and 4. The environmental seal member 30 is of annular form and defines a sealing surface 32 of part conical form, having a different cone angle to that of the seating surface 28, as illustrated in FIG. 2. Accordingly, it will be appreciated that, in use, engagement of the valve member 10 with the seating surface 28 requires parts of the environment seal member 30 to deflect. The environmental seal member 30 is secured to and abuts an end face 34 of the valve member 10, being secured in position by a retainer member 36.

The retainer member 36 comprises a screw threaded shaft 38 arranged to be received within a corresponding threaded bore 40 formed in the valve member 10. Integrally formed with the shaft 38 is an outwardly projecting flange 42 having a substantially conical peripheral surface 44. An annular recess 46 is formed in the surface 44, adjacent the part thereof of maximum diameter, the recess 46 serving to define a resilient, relatively flexible lip 48 on the flange 42 of the retainer member 36. As will be described hereafter, one of the functions of the lip 48 is to enhance sealing, and so it is referred to hereinafter as a sealing lip 48.

As shown in the drawings, the environmental seal member 30 is held captive between the end face 34 of the valve member 10 and a rear face 50 of the flange 42.

The environmental seal member 30 includes, on the face thereof which faces towards the end face 34 of the valve member, a pair of annular ribs 52, each of which is of tapering cross-section. Slots 54 may extend through the ribs 52. Whilst annular ribs 52 are provided in this embodiment, it will be appreciated that a range of other features could be provided. The void defined between the ribs 52, and the slots 54, together serve to define a relatively unrestricted flow passage between the inner periphery and the outer periphery of the seal member 30. This is advantageous in that, in use, if leakage occurs past the valve member 10, and hence the volume in which the environmental seal member 30 is located may become pressurised to a significant extent, upon subsequent opening of the valve there may be a pressure imbalance between the inner and outer peripheries of the environmental seal member 30 causing expansion thereof. Such expansion may cause permanent damage to the environmental seal member 30. By providing the flow passages, upon opening of the valve pressure differentials between the inner and outer peripheries of the seal member 30 can be rapidly relieved, and so the risk of such damage is reduced.

The valve member 10 and retainer member 36 are conveniently of steel construction or of another suitable metal. Likewise, the housing 14 is conveniently of steel or another metal. The environmental seal member 30 is preferably of PTFE form. However, it will be appreciated that other resiliently compressible materials could be used.

In use, when the valve member 10 is in engagement with the seating surface 28, it will be appreciated that the environmental seal member 30 will be compressed between the valve housing 10 and the seating surface 28. The compression may be greatest in the thinner parts thereof, for example in the region of the ribs 52 and adjacent the radially outer periphery of the member 30. This energisation and compression of the environmental seal member 30 results in resilient deflection thereof and in the application of a load to the surface 50 of the retainer member 36 which, in turn, results in deflection of the sealing lip 48 thereof such that the sealing lip 48 engages the seating surface 28.

The engagement of the sealing lip 48 with the seating surface 28 serves to ensure that no voids are present between the periphery of the retainer member 36 and the seating surface 28 into which parts of the seal member 30 could otherwise deform or extrude. As a result, the formation of so-called 'tails' is reduced. By reducing damage to the seal member 30 in this manner it will be appreciated that the life thereof may be extended. Furthermore, by avoiding the formation of such tails, the risk of such tails subsequently becoming jammed or trapped between the sealing surface 26 and the seating surface 28 is reduced, and so the reliability of the valve is enhanced.

Secondly, the engagement of the sealing lip 48 with the seating surface 28 serves to form an additional metal-to-metal seal, thereby further enhancing the sealing ability of the valve.

It will be appreciated that a valve of this type thus not only includes a primary seal formed as a result of the engagement between the sealing surface 26 of the valve member 10 and the seating surface 28, and a secondary seal formed as a result of the engagement between the environmental seal member 30 and the seating surface 28, but also includes a tertiary seal formed as a result of the engagement between the sealing lip 48 and the seating surface 28. Furthermore, both the primary seal and the tertiary seal take the form of metal-to-metal seals. The sealing performance of the check valve is thus enhanced.

When the valve is open, the valve member 10 being lifted from the seating surface 28, it will be appreciated that the environmental sealing member 30 and sealing lip 48 can return to their original, undeflected shapes.

Whilst one embodiment of check valve in accordance with the invention is described herein with reference to the drawings, it will be appreciated that a number of modifications and alterations may be made thereto without departing from the scope of the invention as defined by the appended claims.

The invention claimed is:

1. A check valve comprising:
a valve member movable within a passage provided in a housing, the valve member including a sealing surface, the passage defining a seating surface with which the sealing surface of the valve member is engageable to control fluid flow along the passage;
a spring applying a biasing load to the valve member urging the sealing surface of the valve member into engagement with the seating surface; and
an environmental seal member releasably secured to the valve member by a retainer member, the environmental seal member being engageable with the seating surface, wherein the retainer member includes a deflectable lip, the deflectable lip being elastically deflectable into engagement with the seating surface by the environmental seal member upon compression and/or deflection of the environmental seal member.

2. The valve according to claim 1, wherein the engagement between the deflectable lip and the seating surface substantially prevents extrusion of the environmental seal member between the seating surface and the retainer member.

3. The valve according to claim 1, wherein the engagement between the deflectable lip and the seating surface is a sealing engagement, thereby enhancing the sealing of the valve.

4. The valve according to claim 1, wherein the valve member is guided for sliding movement within the passage.

5. The valve according to claim 1, wherein the environmental seal member is of a PTFE material.

6. The valve according to claim 1, wherein the retainer member is of metallic form such that the engagement between the deflectable lip and the seating surface is a metal-to-metal engagement.

7. The valve according to claim 1, wherein the retainer member is shaped to include an annular recess adjacent its periphery, whereby the deflectable lip is defined.

8. The valve according to claim 1, wherein the retainer member is secured to the valve member by being in screw threaded engagement therewith.

9. The valve according to claim 1, wherein the environmental seal member includes a sealing surface of substantially conical form, having a different cone angle to the seating surface.

10. The valve according to claim 1, wherein the environmental seal member includes at least one annular rib projecting towards and engaging part of the valve member.

11. The valve according to claim 10, wherein a slot extends through the annular rib.

* * * * *